US006214254B1

(12) United States Patent
Gauthier et al.

(10) Patent No.: US 6,214,254 B1
(45) Date of Patent: Apr. 10, 2001

(54) OXYGEN SCAVENGING COMPOSITION AND METHOD OF USING THE SAME

(75) Inventors: William Gauthier, Houston, TX (US); Drew Ve. Speer, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/334,428

(22) Filed: Jun. 16, 1999

Related U.S. Application Data
(60) Provisional application No. 60/091,244, filed on Jun. 30, 1998.

(51) Int. Cl.[7] .............................. C09K 15/02; C09K 15/06
(52) U.S. Cl. ...................... 252/188.28; 252/399; 522/66; 428/35.8; 428/35.2; 428/411.7
(58) Field of Search ............................... 252/188.28, 399; 428/35.3, 35.7, 411.7, 35.9, 35.8, 35.2; 522/66

(56) References Cited

U.S. PATENT DOCUMENTS

| | | | |
|---|---|---|---|
| 5,021,515 | 6/1991 | Cochran et al. | 525/371 |
| 5,049,624 | 9/1991 | Adams et al. | 525/371 |
| 5,211,875 | 5/1993 | Speer et al. | 252/188.28 |
| 5,310,497 | 5/1994 | Speer et al. | 252/188.28 |
| 5,346,644 | 9/1994 | Speer et al. | 252/188.28 |
| 5,350,622 | 9/1994 | Speer et al. | 428/215 |
| 5,376,732 | 12/1994 | Stover et al. | 525/388 |
| 5,399,289 | 3/1995 | Speer et al. | 252/188.28 |
| 5,425,896 | 6/1995 | Speer et al. | 252/188.28 |
| 5,468,814 | 11/1995 | Stover et al. | 525/390 |
| 5,498,364 | 3/1996 | Speer et al. | 252/188.28 |
| 5,529,833 | 6/1996 | Speer et al. | 428/215 |
| 5,627,239 | 5/1997 | Ching et al. | 525/330.6 |
| 5,648,020 | 7/1997 | Speer et al. | 252/188.28 |
| 5,660,761 * | 8/1997 | Katsumoto et al. | 252/188.28 |
| 5,700,554 | 12/1997 | Speer et al. | 428/220 |
| 5,776,361 * | 7/1998 | Katsumoto et al. | 252/188.28 |
| 5,811,027 | 9/1998 | Speer et al. | 252/188.28 |
| 5,981,676 * | 11/1999 | Gauthier et al. | 526/308 |

FOREIGN PATENT DOCUMENTS

| | | |
|---|---|---|
| WO 95/04776 | 2/1995 | (WO) . |
| WO 98/06779 | 2/1998 | (WO) . |
| WO 99/16824 | 4/1999 | (WO) . |

OTHER PUBLICATIONS

"Autoxidation Reactions of Polystyrene Derivatives", *Die Makromolekulare Chemie*, 183, 1225—1231 (1982) Yasukazu Ohkatsu; Tetsuo Tanaka; and Teiji Tsuruta.

"Cobalt–Catalyzed Oxidation of Poly(4–methylstyrene)", *Macromolecules*, 24, 6340–6342, 1991 Lorenzo P. Ferrari and Harald D. H. Stöver.

"Selective Functionalization of Poly(4–methylstyrene)", *Macromolecules*, 30, 6451—6457 (1997) Quan Sheng and Harald D. H. Stöver.

"Autoxidation of Polystyrene Derivatives", *Sekiyu Gakkaishi*, 30, (5), 348–352 (1987) Masaru Ibonai; Yasukazu Ohkatsu; Tomohiro Kuramochi; and Tadatomo Kawai.

"Synthesis of New Polyolefiin Elastomers, Poly(ethylene–ter–propylene–ter–p–methylstyrene) and Poly(ethylene–ter–1–octene–ter–p–methylstyrene), Using Metallocene Catalysts with Constrained Ligand Geometry", *Macromolecules*, 31, 2028–2034, 1998, H. L. Lu; S. Hong; and T. C. Chung.

* cited by examiner

*Primary Examiner*—Joseph D. Anthony
(74) *Attorney, Agent, or Firm*—Mark B. Quatt

(57) ABSTRACT

A composition that includes a polymer having mer units derived from at least one vinyl aralkyl compound, a transition metal catalyst, preferably a photoinitiator, and optionally a polymeric diluent is capable of scavenging oxygen and of being processed into articles with oxygen scavenging capabilities.

11 Claims, No Drawings

OXYGEN SCAVENGING COMPOSITION AND METHOD OF USING THE SAME

This application claims the benefit of provisional application No. 60/091,244, filed on Jun. 30, 1998.

BACKGROUND INFORMATION

1. Field of the Invention

This invention relates to a composition useful in scavenging oxygen from environments containing oxygen-sensitive products, particularly food and beverage products. More specifically, the oxygen scavenging composition includes a polymer having mer units derived from a vinyl aralkyl compound, a transition metal compound and, optionally, a photoinitiator.

2. Background of the Invention

Limiting the exposure of oxygen-sensitive products to oxygen maintains and enhances the quality and shelf life of many products. For instance, by limiting the oxygen exposure of oxygen-sensitive food products in a packaging system, the quality of the food product can be maintained and spoilage retarded. In addition, such packaging also keeps the product in inventory longer, thereby reducing costs incurred from waste and having to restock.

In the food packaging industry, several techniques for limiting oxygen exposure have been developed. Common techniques include those where oxygen is consumed within the packaging environment by some means other than the packaged article or the packaging material (e.g., through the use of oxygen scavenging sachets), those where reduced oxygen environments are created in the package (e.g., modified atmosphere packaging (MAP) and vacuum packaging), and those where oxygen is prevented from entering the packaging environment (e.g., barrier films).

Sachets containing an oxygen scavenging compositions can contain ferrous compositions, which oxidize to their ferric state, unsaturated fatty acid salts on an absorbent, and/or a metal/polyamide complex. See, e.g., U.S. Pat. Nos. 4,908,151 and 5,194,478. The disadvantages of sachets include the need for additional packaging steps (to add the sachet to the package), the potential for contamination of the packaged article should the sachet break, and the danger of digestion by a consumer.

Oxygen scavenging materials also have been incorporated directly into the packaging structure. This technique (hereinafter referred to as "active oxygen barrier") can provide a uniform scavenging effect throughout the package and can provide a means of intercepting and scavenging oxygen as it passes through the walls of a package, thereby maintaining the lowest possible oxygen level through-out the package. Active oxygen barriers have been formed by incorporating inorganic powders and/or salts as part of the package. See, e.g., U.S. Pat. Nos. 5,153,038, 5,116,660, 5,143,769, and 5,089,323. However, incorporation of such powders and/or salts can degrade the transparency and mechanical properties (e.g., tear strength) of the packaging material and can complicate processing, especially where thin films are desired. Also, these compounds as well as their oxidation products can be absorbed by food in the container, which can result in the food product failing to meet governmental standards for human consumption.

EP 0 519 616 discloses an oxygen scavenging composition that includes a blend of an epoxide, a first polymeric component grafted with an unsaturated carboxylic anhydride and/or acid, a second polymeric component including OH, SH, or $NHR^2$ groups where $R^2$ is H, $C_1$–$C_3$ alkyl, or substituted $C_1$–$C_3$ alkyl moiety, and a metal salt capable of catalyzing the reaction between oxygen and the second polymeric component. The first polymeric component is present in an amount sufficient to ensure that the blend is non-phase separated. A blend of polymers is utilized to obtain oxygen scavenging, and the second polymeric component is preferably a (co)polyamide such as MXD6.

Another type of active oxygen barrier is illustrated in EP-A-0 301 719, EP-A-0 380 319, PCT publication no. WO 90/00578, and PCT publication no. WO 90/00504. See also U.S. Pat. Nos. 5,021,515, 5,194,478, and 5,159,005. The disclosed oxygen scavenger includes polyamide-transition metal catalyst compositions. Through catalyzed scavenging by the polyamide, the package wall regulates the amount of oxygen reaching the interior of the package. However, the onset of useful oxygen scavenging (i.e., up to about 5.8× $10^{-5}$ $cm^3/m^2 \cdot s$ or 5 $cm^3/m^2 \cdot 24$ hours at ambient conditions) can take as long as 30 days to occur. Therefore, this technique is not acceptable for many applications. Further, polyamides typically are incompatible with many thermoplastic polymers commonly used to make flexible packaging materials (e.g., ethylene/vinyl acetate copolymers, low density polyethylene, etc.) or, when used by themselves, are difficult to process and result in inappropriately stiff structures.

Oxygen scavenging compositions that include transition metal catalysts and ethylenically unsaturated hydrocarbon polymers which have an ethylenic double bond content of from 0.01 to 10 equivalents per 100 grams of polymer are disclosed in U.S. Pat. No. 5,399,289. Various conventional homopolymers, copolymers, and polymer blends are disclosed. Because these polymers are amorphous, they can be difficult to blend and process with film-forming semi-crystalline polymers conventionally used to make flexible packaging materials.

The use of a transition metal and a photoinitiator to facilitate initiation of effective scavenging activity of ethylenically unsaturated compounds is taught in U.S. Pat. No. 5,211,875. Because of the limited compatibility of the scavenger polymer with the film forming polymer, the amount of scavenger polymer in the blend must be limited and the resultant composition is difficult to process.

PCT publication Nos. WO 95/02616 and WO 96/40799 disclose a scavenger composition that includes a transition metal salt and a copolymer (of ethylene and a vinyl monomer) having ether, amino, carboxylic acid, ester, or amide functionalities pendent therefrom. Although this composition can provide oxygen scavenging activity, the active components can act too slowly to be effective, do not have good hydrolytic stability, and can decompose during scavenging to impart odor, color, or taste impurities to the packaged product.

Ideally, a polymeric material for use in an oxygen scavenging composition should exhibit good processing characteristics, be able to be formed directly into useful packaging materials or have high compatibility with those polymers commonly used to make packaging materials, and not produce byproducts which detract from the color, taste, or odor of the packaged product. Optimally, a packaging material formed from such a composition can retain its physical properties after significant oxygen scavenging.

SUMMARY OF THE INVENTION

Briefly, the present invention provides an oxygen scavenging composition including a polymer that includes mer units derived from at least one vinyl aralkyl compound; a transition metal catalyst; preferably, a photoinitiator; and optionally, a diluent material. This composition has been found to exhibit a high degree of processability, to be highly compatible with conventional polymers used in forming packaging materials, to exhibit significant ability to scavenge oxygen while part of a film or article used to package an oxygen sensitive product, and to produce insignificant amounts of organoleptic byproducts which can detract from the packaged product's odor, color, and/or taste.

In other aspects, the present invention provides an article which include at least one layer formed from a blend that includes the foregoing composition as well as a method of scavenging oxygen in which a packaging article, at least one layer of which is formed from a blend that includes the foregoing composition, is exposed to actinic or e-beam radiation so as to activate the composition.

The following definitions apply herein throughout unless a contrary intention is expressly indicated:

"polymer" means the polymerization product of one or more monomers and includes homopolymers, as well as interpolymers;

"interpolymer" means the polymerization product of two or more kinds of monomers;

"(meth)acrylate" means acrylate or methacrylate;

"photoinitiator" means a substance which, when activated by actinic radiation, enhances and/or facilitates the initiation of one or more properties (e.g., oxygen scavenging) in another compound, thus resulting in a shorter induction period and/or an increase in the rate of oxygen uptake of the overall system;

"induction period" means the length of time beginning with the initiation of the active components of a composition and ending with the onset of one or more useful properties (e.g., oxygen scavenging); and "antioxidant" means a material which can inhibit oxidative degradation and/or crosslinking of a polymer so as to, for example, prolong the useful lifetime of the polymer; to stabilize a polymer-containing composition during processing (e.g., extrusion, coating, lamination, etc.); and/or to prolong the shelf-life of the composition (prior to exposure thereof to actinic or e-beam radiation).

DETAILED DESCRIPTION OF ILLUSTRATIVE EMBODIMENTS

The oxygen scavenging composition of the present invention includes one or more polymers that include mer units derived from at least one vinyl aralkyl compound as an active scavenging agent. This polymer can possess sufficient crystallinity such that it is highly compatible with polymers conventionally used in the manufacture of packaging films and laminated structures (e.g., polyolefins and the like) and provides a composition which has good processing characteristics such as, for example, low susceptibility to melt fracture even under the high shear stress conditions often encountered in extrusion processing.

The aforementioned vinyl aralkyl compounds can be represented by $CH_2=CHA$ (Formula I) in which A is an aralkyl group which is directly pendent from an olefinic carbon. The aromatic ring(s) of the aralkyl moiety has/have at least one hydrogen atom replaced by a $C_1-C_{12}$ alkyl group, preferably a $C_1-C_5$ alkyl, and most preferably a $C_1-C_3$ alkyl group. Where more than one alkyl group is substituted on the aromatic ring(s), they can be the same or different. At least one of the alkyl group(s) can contain at least one benzylic hydrogen. The aryl moiety can include a single aromatic ring (e.g., phenyl), fused aromatic rings (e.g., naphthyl, anthryl, phenanthryl, and the like), and/or non-fused aromatic rings (e.g., biphenyl).

A preferred A group includes a single aromatic ring (e.g., a phenyl moeity) with at least one $C_1-C_3$ alkyl group substituted thereon. Representative vinyl aralkyl compounds include 3-methyl styrene, 4-methyl styrene, 4-ethyl styrene, 4-isopropyl styrene, 3,5dimethyl styrene, 3-methyl-5-ethyl styrene, mixtures of any two or more of the foregoing, and the like.

The polymeric component of the composition of the present invention can be a homopolymer of one of the foregoing vinyl aralkyl compounds such as, for example, poly(3-methyl styrene) or an interpolymer having mer units derived from two or more different such vinyl aralkyl compounds such as, for example, the polymerization product of commercial grade methyl styrene which is a mixture of 3-methyl styrene and 4-methyl styrene. Alternatively, the polymeric component can be an interpolymer where, in addition to having mer units derived from one or more vinyl aralkyl compounds described above, at least some mer units thereof are derived from one or more additional monomers. Potentially useful additional monomers include any one or more of the following: $C_2-C_{20}$ α-olefins (such as ethylene, propylene, 1-butene, 1-pentene, 1-hexene, 3-methyl butene-1, 1-octene, 4-methyl pentene, and the like); cycloolefins such as, for example, cyclopentene, norbornene, tetracylododecene, and the like; dienes such as, for example, 5-ethylidene-2-norbornene, 5-vinyl-2-norbornene, 5-methylene-2-norbornene, 2,5-norbornadiene 1,3-divinylcyclohexane, 1,4-divinyl cyclohexane, 1-allyl-5-vinylcyclooctane, dicyclopentadiene, 1,4-hexadiene, 1,7-octadiene, 4-vinyl cyclohexene, and butadiene; (meth) acrylate and alkyl (meth)acrylates; vinyl acetate; and vinyl aromatic compounds such as styrene, α-methyl styrene, and the like.

When oxygen scavenging under low temperature conditions is desired, interpolymers having a glass transition temperature ($T_g$) of less than about $-15°$ C., preferably less than about $-25°$ C. can provide rapid oxygen scavenging activity under low temperature conditions.

From the foregoing, one can see that the polymeric component of the composition of the present invention can include substantially 100 mole percent mer units derived from a single vinyl aralkyl compound (i.e., all units derived from one Formula I compound), substantially 100 mole percent mer units derived from more than one vinyl aralkyl compound (i.e., all units derived from a mixture, in any proportion, of Formula I compounds), or from about 0.1 to about 99.9 mole percent mer units derived from at least one vinyl aralkyl compound and the remainder of mer units derived from one or more additional monomers. Where the polymeric component is of the latter type, the mer units derived from vinyl aralkyl compound(s) preferably represent at least about 1 mole percent, more preferably at least about 5 mole percent, of the interpolymer. Mer units derived from one or more vinyl aralkyl compounds preferably make up about 0.1 to about 50 mole percent, more preferably from about 1 to about 10 mole percent, of the interpolymer.

A preferred interpolymer can be formed by polymerizing ethylene and one or more methyl styrenes such as 3(4)-methyl styrene (which is a blend of 3- and 4-methyl styrene such as is found when purchasing commercial grade methyl styrene). Such an interpolymer preferably has from about 1 to about 35 mole percent, more preferably from about 1 to about 10 mole percent, and most preferably from about 2 to about 8 mole percent mer units derived from methyl styrene (as determined by carbon-13 NMR spectroscopy).

The weight average molecular weight ($M_w$) of the polymeric component can vary depending on the particular monomer(s) used, the amounts of the respective monomer(s), and the particular catalyst(s) used in the formation thereof. In general, $M_w$ can range from about 10,000 to about 1,000,000 g/mol, with about 25,000 to about 125,000 g/mol being most common. Regulating the molecular weight can be accomplished by introducing hydrogen into the polymerization reaction vessel or by other known chain transfer techniques.

The polymeric component can be formed into a film or other suitable packaging materials such as, for example, a bag or a pouch. It can be used as the sole polymeric material from which one or more layers of a film are formed (i.e., the film can be a multilayer film having, for example, a gas barrier layer, a seal layer, etc.), it can be blended with other polymeric oxygen scavenging agents (such as polybutadiene) or it can be blended with one or more diluent polymers which are known to be useful in the formation of packaging film materials and which often can render the resultant film more flexible and/or processable. Suitable diluent polymers include, but are not limited to, polyethylenes such as, for example, low density polyethylene, very low density polyethylene, ultra-low density polyethylene, high density polyethylene, and linear low density polyethylene; polyesters such as, for example, polyethylene terephthalate (PET); polyvinyl chloride (PVC); polyvinyl-idene chloride (PVDC); and ethylene interpolymers such as ethylene/vinyl acetate copolymer, ethylene/alkyl (meth)acrylate copolymers, ethylene/(meth)acrylic acid copolymers, and ionomers. Blends of different diluent polymers also can be used.

Generally, the foregoing diluent polymers are semi-crystalline materials. Advantageously, the polymeric component of the composition of the present invention can be crystalline or semi-crystalline at ambient conditions and, accordingly, can be especially compatible with such diluent polymers. Selection of a particular diluent polymer(s) depends largely on the article to be manufactured and the end use thereof. For instance, certain polymers are known by the ordinarily skilled artisan to provide clarity, cleanliness, barrier properties, mechanical properties, and/or texture to the resultant article.

In combination with the polymeric component, the oxygen scavenging composition of the present invention includes a transition metal compound as a scavenger catalyst. The transition metal catalyst can be a salt which includes a metal selected from the first, second, or third transition series of the Periodic Table. The metal preferably is Rh, Ru, or one of the elements in the series of Sc to Zn (i.e., Sc, Ti, V, Cr, Mn, Fe, Co, Ni, Cu, and Zn), more preferably at least one of Mn, Fe, Co, Ni, and Cu, and most preferably Co. Suitable anions for such salts include, but are not limited to, chloride, acetate, oleate, stearate, palmitate, 2-ethylhexanoate, neodecanoate, and naphthenate. Representative salts include cobalt (II) 2-ethylhexanoate, cobalt oleate, and cobalt (II) neodecanoate. (The metal salt also can be an ionomer, in which case a polymeric counterion is employed.)

When used in forming a packaging article, the oxygen scavenging composition of the present invention can include only the above-described polymer and transition metal catalyst. However, photoinitiators can be added to further facilitate and control the initiation of oxygen scavenging properties. Adding a photoinitiator or a blend of photoinitiators to the oxygen scavenging composition can be preferred, especially where antioxidants have been added to prevent premature oxidation of the composition during processing and storage.

Suitable photoinitiators are known to those skilled in the art. See, e.g., PCT publication no. WO 97/07161 and U.S. patent application Ser. No. 08/857,276, the teachings of which are incorporated herein by reference. Specific examples of suitable photoinitiators include, but are not limited to, benzophenone, o-methoxy-benzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, substituted and unsubstituted anthraquinones, α-tetralone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone, 2,3-butanedione, benz[a]anthracene-7,12-dione, 2,2-dimethoxy-2-phenylacetophenone, α,α-diethoxyacetophenone, α,α-dibutoxyacetophenone, and the like. Single oxygen-generating photosensitizers such as Rose Bengal, methylene blue, and tetraphenylporphine as well as polymeric initiators such as poly(ethylene carbon monoxide) and oligo[2-hydroxy-2-methyl-1-[4-(1-methylvinyl)phenyl] propanone] also can be used. However, photoinitiators are preferred because they generally provide faster and more efficient initiation. When actinic radiation is used, photoinitiators also can provide initiation at longer wavelengths which are less costly to generate and present less harmful side effects than shorter wavelengths.

When a photoinitiator is present, it can enhance and/or facilitate the initiation of oxygen scavenging by the composition of the present invention upon exposure to radiation. The amount of photoinitiator can depend on the amount and type of mer units derived from vinyl aralkyl compound(s) present in the polymer, the wavelength and intensity of radiation used, the nature and amount of antioxidants used, and the type of photoinitiator used. The amount of photoinitiator also can depend on how the scavenging composition is used. For instance, if a photoinitiator-containing composition is in a film layer, which underneath another layer is somewhat opaque to the radiation used, more initiator might be needed. However, the amount of photoinitiator used for most applications ranges from about 0.01 to about 10% (by wt.) of the total composition. Oxygen scavenging can be initiated by exposing an article containing the composition of the present invention to actinic or electron beam radiation, as described below.

One or more antioxidants can be incorporated into the scavenging composition of the present invention to retard degradation of the components during compounding and film formation. Although such additives prolong the induction period for oxygen scavenging activity to occur in the absence of irradiation, the layer or article (and any incorporated photoinitiator) can be exposed to radiation at the time oxygen scavenging properties are required. Suitable antioxidants include 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, and the like.

When an antioxidant is included as part of the composition of the present invention, it preferably is present in an amount which prevents oxidation of the components of the oxygen scavenging composition as well as other materials present in a resultant blend during formation and processing; however, the amount preferably is less than that which interferes with the scavenging activity of the resultant layer, film, or article after initiation has occurred. The amount needed in a given composition can depend on the components present therein, the particular antioxidant used, the degree and amount of thermal processing used to form the shaped article, and the dosage and wavelength of radiation applied to initiate oxygen scavenging. Typically, such antioxidant(s) are used in an amount of from about 0.01 to about 1% (by wt.).

Other additives that also can be included in the oxygen scavenging composition of the present invention include, but are not necessarily limited to, fillers, pigments, dyestuffs, stabilizers, processing aids, plasticizers, fire retardants, anti-fog agents, antiblocking agents, and the like.

The amounts of the components used in the oxygen scavenging composition of the present invention can affect the use and effectiveness of this composition. Thus, the amounts of polymer, transition metal catalyst, and any photoinitiator, antioxidant, polymeric diluents, additives, etc., can vary depending on the desired article and its end use. For example, one of the primary functions of the polymer described above is to react irreversibly with oxygen during the scavenging process, while a primary function of the transition metal catalyst is to facilitate this process. Thus, to a large extent, the amount of polymer present affects the oxygen scavenging capacity of the composition, i.e., the amount of oxygen that the composition can consume, while the amount of transition metal catalyst affects the rate at which oxygen is consumed as well as the induction period.

The composition of the present invention can provide oxygen scavenging properties at a desirable rate and capacity while having good processing and compatibility properties relative to compositions including conventional ethylenically unsaturated polymers. Thus, the present composition can be used to provide, by itself or as a blend with diluent film-forming polymers such as polyolefins and the like, a packaging material or film that can be manufactured and processed easily. Further, the subject oxygen scavenging composition is believed to consume and deplete the oxygen within a package cavity without substantially detracting from the color, taste, and/or odor of the product contained therein.

The amount of the polymeric component contained in the subject composition can range from about 1 to almost about 100%, preferably from about 5 to about 97.5%, more preferably from about 10 to 95%, even more preferably from about 15 to about 92.5%, still more preferably from about 20 to about 90%, (with all of the foregoing percentages being by weight) of the composition or layer made therefrom. Typically, the amount of transition metal catalyst can range from 0.001 to 1% (by wt.) of the scavenging composition, based on the metal content only (i.e., excluding ligands, counterions, etc.). Where one or more other scavenging compounds and/or diluent polymers are used as part of the composition, such other materials can make up as much as 99%, preferably up to about 75%, by weight of the scavenging composition. Any further additives employed normally do not make up more than 10%, preferably no more than about 5%, by weight of the scavenging composition.

The oxygen scavenging composition of the present invention can have enhanced properties not achievable by conventional scavenging compositions. The polymeric component can have a high content of vinyl aralkyl units (i.e., a high scavenging capacity). Films suitable for packaging applications can be formed directly from the polymer/transition metal composition. Further, the present composition can have a high content of polymeric scavenging component even when the composition contains a diluent polymer. As stated above, the polymer is highly compatible with known film forming polymers, such as polyolefins and in particular semi-crystalline polymers conventionally used in providing film packaging articles. Because of this high compatibility, the polymer and other diluent polymer can be readily blended in any ratio. In contrast, previously used amorphous ethylenically unsaturated polymers do not readily provide high content blends suitable for processing (e.g., extruded) into films and the like. The polymeric scavenging agent can be blended readily with polymers including mer units derived from a diene (e.g., butadiene) to provide a composition having a low $T_g$. Such blends provide high oxygen scavenging activity even when used at low temperatures (such as are encountered in a refrigerator or freezer). The composition of the present invention can be processed (e.g., extruded) readily at high rates into films or film layers having desirable characteristics such as, for example, high clarity, reduced surface imperfections at high extrusion rates, and the like.

As indicated above, the composition of the present invention can be used to produce a scavenging monolayer film, a scavenging layer of a multilayer film, or other articles for a variety of packaging applications. Single layer articles can be prepared readily by extrusion processing. Multilayer films typically are prepared using coextrusion, coating, lamination or extrusion/lamination as taught in, for example, U.S. Pat. Nos. 5,350,622 and 5,529,833, the teachings of which are incorporated herein by reference. At least one of the additional layers of a multilayer article can include a material having a permeance to oxygen of no more than about $5.8 \times 10^{-8}$ cm$^3$/m$^2$·s·Pa (i.e., about 500 cm$^3$/m$^2$·24 hours·atm) at about 25° C. Polymers which are commonly used in such oxygen barrier layers include poly(ethylene/vinyl alcohol), poly(vinyl alcohol), polyacrylonitrile, PVC, PVDC, PET, silica, and polyamides such as nylon 6, MXD6, nylon 66, as well as various amide interpolymers. (Metal foil layers can also provide oxygen barrier properties.) Other additional layers can include one or more layers which are permeable to oxygen. In one preferred packaging construction, especially flexible packages for food, the layers can include (in order starting from the outside of the package to the innermost layer of the package) (a) an oxygen barrier layer, (b) a scavenging layer, i.e. one that includes the scavenging composition described supra, and optionally, (c) an oxygen permeable layer. Control of the oxygen barrier property of layer (a) provides a means to regulate the scavenging life of the package by limiting the rate of oxygen entry to the scavenging layer (b), thus limiting the rate of consumption of scavenging capacity. Control of the oxygen permeability of layer (c) provides a means to set an upper limit on the rate of oxygen scavenging for the overall structure independent of the composition of scavenging layer (b). This can serve the purpose of extending the handling lifetime of the film in the presence of air prior to sealing of the package. Furthermore, layer (c) can provide a barrier to migration of the individual components or byproducts of the scavenging layer into the package interior. The term "exposed to the interior" refers to a portion of a packaging article having the subject scavenging composition which is either directly exposed or indirectly exposed (via layers which are $O_2$ permeable) to the interior cavity having oxygen sensitive product. Even further, layer (c) also can improve the heat sealability, clarity, and/or resistance to blocking of the multilayer film. Further additional layers such as be layers also can be used. Polymers typically used in such tie layers include, for example, anhydride functional polyolefins.

The method of the present invention includes exposing the above-described composition to a package cavity having an oxygen sensitive product therein. A preferred embodiment provides for including a photoinitiator as part of the subject composition and subjecting a film, layer, or article that includes such a composition to radiation so as to initiate oxygen scavenging at desired rates. The radiation produced in heating and processing polymers typically used in packaging films (e.g., 100–250° C.) advantageously does not trigger oxygen scavenging.

The initiating radiation preferably is actinic, e.g., UV or visible light having a wavelength of from about 200 to about 750 nm, preferably of from about 200 to 600 nm, and most preferably from about 200 to 400 nm. The layer, film, etc., containing the oxygen scavenging composition preferably is exposed to such radiation until it receives at least about 1 J/g of radiation, more preferably until it receives a dose in the range of about 10 to about 2000 J/g. The radiation also can be e-beam radiation at a dosage of at least about 2 kiloGray (kG), preferably from about 10 to about 100 kG. Other potential sources of radiation include ionizing radiation such as gamma, X-ray, and corona discharge. Duration of exposure depends on several factors including, but not limited to, the amount and type of photoinitiator present, thickness of the layers to be exposed, thickness and opacity of intervening layers, amount of any antioxidant present, and the wavelength and intensity of the radiation source.

When using oxygen scavenging layers or articles, irradiation can occur during or after the layer or article is prepared. If the resulting layer or article is to be used to package an oxygen sensitive product, exposure can be just prior to, during, or after packaging. For best uniformity of radiation, exposure preferably occurs at a processing stage where the layer or article is in the form of a flat sheet. For further information on initiation via irradiation, the reader is directed to PCT publications WO 98/05555 and WO 98/05703, the teachings of which are incorporated herein by reference.

Determining the oxygen scavenging rate and capacity of a given oxygen scavenging composition contemplated for a particular use can be beneficial. To determine the rate, the time elapsed before the scavenger depletes a certain amount of oxygen from a sealed container is measured. In some instances the rate can be determined adequately by placing a film containing the desired scavenging composition in an air-tight, sealed container of an oxygen containing atmosphere, e.g., air which typically contains 20.6% (by vol.) $O_2$. Over time, samples of the atmosphere inside the container are removed to determine the percentage of oxygen remaining. (Usually, the specific rates obtained vary under different temperature and atmospheric conditions. Atmospheres having lower initial oxygen content and/or maintained under low temperature conditions provide a more stringent test of the scavenging ability and rate of a composition. The rates which follow are at room temperature and one atmosphere of air, unless otherwise specified.)

When an active oxygen barrier is needed, a useful scavenging rate can be as low as about 0.05 $cm^3$ oxygen per gram of the polymer in the scavenging composition per day in air at 25° C. and at 1 atm. However, in most instances, the present composition has a rate equal to or greater than about $5.8 \times 10^{-6}$ $cm^3/g \cdot s$ (0.5 $cm^3/g \cdot day$), even up to or greater than about $5.8 \times 10^{-5}$ $cm^3/g \cdot s$ (5 $cm^3/g \cdot day$). Further, films or layers including the subject composition are capable of a scavenging rate greater than about $1.2 \times 10^{-4}$ $cm^3/m^2 \cdot s$ (10 $cm^3/m^2 \cdot day$) and under some conditions, greater than about $2.9 \times 10^{-4}$ $cm^3/m^2 \cdot s$ (25 $cm^3/m^2 \cdot day$). (Generally, films or layers generally deemed suitable for use as an active oxygen barrier can have a scavenging rate as low as $1.2 \times 10^{-5}$ $cm^3/m^2 \cdot s$ (1 $cm^3/m^2 \cdot day$) when measured in air at 25° C. and 101 kPa (1 atm). Such rates make those layers suitable for scavenging oxygen from within a package, as well as suitable for active oxygen barrier applications.

When the method of the present invention is to be used in an active oxygen barrier application, the initiated oxygen scavenging activity, in combination with any oxygen barriers, preferably creates an overall oxygen permeance of less than about $1.1 \times 10^{-10}$ $cm^3/m^2 \cdot s \cdot Pa$ (1.0 $cm^3/m^2 \cdot day \cdot atm$) at 25° C. The oxygen scavenging capacity preferably is such that this value is not exceeded for at least two days.

Once scavenging has been initiated, the scavenging composition, layer, or article prepared therefrom preferably is able to scavenge up to its capacity, i.e., the amount of oxygen which the scavenger is capable of consuming before it becomes ineffective. In actual use, the capacity required for a given application can depend on the quantity of oxygen initially present in the package, the rate of oxygen entry into the package in the absence of the scavenging property, and the intended shelf life for the package. When using scavengers that include the composition of the present invention, the capacity can be as low as 1 $cm^3/g$, but can be 50 $cm^3/g$ or higher. When such scavengers are in a layer of a film, the layer preferably has an oxygen capacity of at least about 9.8 $cm^3/m^2$ per $\mu m$ thickness (250 $cm^3/m^2$ per mil), more preferably at least about 47 $cm^3/m^2$ per $\mu m$ thickness (1200 $cm^3/m^2$ per mil).

The composition of the present invention has been found to be capable of providing a film, layer or article which substantially retains its physical properties (e.g., tensile strength and modulus) even after substantial oxygen scavenging has occurred. In addition, the present composition does not provide substantial amounts of byproduct and/or effluent, which can impart undesired taste, color, and/or odor to the packaged product.

Objects and advantages of this invention are further illustrated by the following examples. The particular materials and amounts thereof, as well as other conditions and details, recited in these examples should not be used to unduly limit this invention.

EXAMPLES

In the following examples, ethylene and argon were purified by passage through columns containing molecular sieves and activated copper. A mixture of 3-methylstyrene and 4-methylstyrene (i.e., 3(4)-methylstyrene) was purified by vacuum distillation from $CaH_2$ at 90° C. and sparged with argon prior to use. A metallocene catalyst precursor, $Me_2Si(CpMe_4)NtBuTiCl_2$ (Norquay Tech. Inc.; Chester, Pa.), was purified by recrystallization from pentane. The $^1H$-NMR spectra of the purified metallocene catalyst precursor was consistent with the literature assignments for this compound. Poly(methylaluminoxane) hereinafter MAO, 7.8% (by wt.)

Al in toluene, was used as obtained (Akzo Nobel; Amersfoort, the Netherlands). All manipulations were carried out using syringes, shot tanks, or cannulae techniques to exclude air and moisture. Catalysts and MAO were stored and transferred under oxygen- and moisture-free atmospheres.

The polymerizations were carried out using a 2 L stainless steel-jacketed autoclave equipped with an overhead magnetically coupled stirrer and a helical impeller driver set at 400 rpm. Temperature control was maintained using an external recirculating bath.

Head pressure and ethylene flow rate were measured and controlled using a calibrated mass flow controller. Agitation rate was typically within 25 rpm of set value whereas temperature and pressure were maintained to within about 1° C. and about 96 kPa (1 psi) respectively.

Density (±0.005 g/cm$^3$) was estimated from strand from the Melt Flow Indexer (MFI, strand density) or by melt pressing a thick (i.e., about 0.25 to about 0.75 mm) film. Density measurements were conducted on an analytical balance using a density adapter with absolute ethanol as the liquid phase with a temperature correction. MFI was measured using a CSI™ MFI-2 melt flow index unit (Custom Scientific Instruments; Cedar Knolls, N.J.) at 190° C. and 2.16 kg ($I_2$) or 10 kg ($I_{10}$) weights according to ASTM D-1238.

Differential scanning calorimetry was conducted at a heating/cooling rate of 10° C. per minute on an instrument calibrated with a National Institute of Standards and Technology indium standard.

$^{13}$C NMR analyses were performed with a Bruker™ AX-400 MHz NMR spectrometer, (Bruker Instruments Inc.; Billerica, Mass.) proton decoupled with benzene-$d_6$ as an internal lock at 120° C. in 1,2,4-trichlorobenzene.

Molecular weight and molecular weight distributions were measured using a Waters™ 150 CV gel permeation chromatograph (Waters Corp.; Milford, Mass.), which was calibrated using narrow molecular weight distribution polystyrene standards, at 150° C. in 1,2,4-trichlorobenzene. The molecular weight distribution, and the statistical moments ($M_n$, $M_w$, $M_z$, etc.) thereof were determined using the universal calibration method.

Examples 1–8

To the aforementioned reactor were charged toluene, 3(4)-methylstyrene, MAO, ethylene, and metallocene catalyst precursor (dissolved in toluene or pentane and added after equilibration of reactants) in the amounts and at the conditions listed in the table below.

Thereafter, the reactor was vented, the contents discharged into a blender containing 1 L methanol, and the resulting mixture vigorously agitated. Polymer product was isolated by filtration and dried in a vacuum oven at 60° C. Properties of the polymer products, as well as films made from some of the polymers, also are given in the table below.

Each of the ethylene/methyl styrene copolymer products were blended with 1000 ppm Ten-Cem™ cobalt(II) neodecanoate (OMG Inc., Cleveland, Ohio) and 0.1 weight percent 4,4'-dimethylbenzophenone (Lancaster Synthesis Inc.; Windham, N.H.) under a nitrogen purge. The blends then were pressed into thin films. Each film was cut into a 197.6 cm$^2$ rectangle and irradiated for 90 about seconds in a multi-exposure irradiation unit (Anderson & Vreeland, Inc.; Bryan, Ohio) set on dual mode (i.e., approximately 1.17 J/cm$^2$ of UVA radiation and approximately 0.80 J/cm$^2$ of UVC radiation). The rectangular samples immediately were placed in Cryovac™ P640B barrier bags (Cryovac North America; Duncan, S.C.). Those bags were impulse sealed and inflated with 300 cm$^3$ of 20.6% oxygen in nitrogen (air) or (where MAP simulation was desired) with 300 cm$^3$ of 2% oxygen in nitrogen. The bags were stored in the dark at room temperature (i.e., 20° to 30° C.). The percentage of oxygen in each bag was measured using a MOCON™ LC700F oxygen analyzer (MOCON Corp.; Minneapolis, Minn.) at a variety of times. These results also are reported in the table below.

The data from Table 1 infra show that films derived from interpolymers containing mer units derived from ethylene and 3(4)-methylstyrene can be effective as oxygen scavenging materials and can possess other desirable properties.

TABLE 1

| | Sample number | | | | | | | |
|---|---|---|---|---|---|---|---|---|
| | 1 | 2 | 3 | 4 | 5 | 6 | 7 | 8 |
| REACTANTS | | | | | | | | |
| Toluene (g) | 830 | 832 | 818 | 820 | 772 | 780 | 802 | 0 |
| 3(4)-methylstyrene (g) | 53 | 55 | 62 | 104 | 119 | 122 | 120 | 441 |
| MAO solution (g) | 10.8 | 6.6 | 2.5 | 5 | 2.6 | 2.6 | 2.6 | 12 |
| Catalyst precursor (mg) | 10 | 5 | 2.5 | 5 | 2[b] | 2[b] | 2[b] | 10 |
| $C_2H_4$ pressure in reactor (kPa) | 170 | 239 | 205 | 768[a] | 765[c] | 765[c] | 765[c] | 520 |
| REACTION CONDITIONS | | | | | | | | |
| Reactor temperature (° C.) | 40 | 40 | 40 | 40 | 75 | 75 | 75 | 40 |
| Reaction time (min.) | 80 | 125 | 300 | 200 | 70 | 85 | 85 | 50 |
| POLYMER PRODUCT | | | | | | | | |
| Amount recovered (g) | 69 | 71 | 49 | 105 | 98 | 123 | 69 | 132 |
| Melt flow index (dg/min, $I_2$) | 3.67 | 1.09 | 1.28 | 0.38 | 2.10 | 2.61 | 4.75 | 0.97 |
| Melting temp. (° C.) | 40 | 40 | 45 | 92 | 96 | 97[d] | 98 | 32[e] |
| Mer units derived from 3(4)-methylstyrene (mol %) | 14.8 | 15.5 | 19.7 | 6 | 5.3 | 5.1 | 5 | 48 |
| $M_n$ (kg/mol) | 51 | 77 | — | — | — | — | — | 120 |
| Polydispersity | 1.7 | 1.7 | — | — | — | — | — | 4.0 |
| Density (g/cm$^3$) | 0.96 | 0.97 | 0.95 | 0.93 | — | — | — | — |
| OPTICAL PROPERTIES | | | | | | | | |

TABLE 1-continued

| | Sample number | | | | | | | |
|---|---|---|---|---|---|---|---|---|
| | 1 | 2 | 3 | 4 | 5 | 6 | 7 | 8 |
| Haze | 7% | 3% | 4% | 12% | — | — | — | — |
| Clarity | 93% | 99% | 97% | 95% | — | — | — | — |
| Gloss | 96% | 99% | 101% | 77% | — | — | — | — |
| OXYGEN SCAVENGING | | | | | | | | |
| Film thickness ($\mu$m) | 333 | 394 | 401 | 465 | 251 | 211 | 211 | 310 |
| Film weight (g) | 6.6 | 7.8 | 7.6 | 8.5 | 4.6 | 3.7 | 3.9 | — |
| % $O_2$ in bag at | | | | | | | | |
| Day 0 | 20.6 | 20.6 | 20.6 | 20.6 | 20.6 | 20.6 | 20.6 | 20.6 |
| Day 1 | 20.5 | 20.3 | 19.7 | 20.6 | 18.5 | 18.5 | 19.0 | 20.3 |
| Day 6 | 19.9 | 20.1 | 16.0 | — | — | — | — | — |
| Day 7 | — | — | — | 19.9 | 10.9 | 9.9 | 10.3 | 19.7 |
| Day 14 | — | — | — | — | 6.7 | 5.7 | 6.0 | — |
| Day 27 | — | — | — | 10.6 | — | — | — | — |
| Day 43 | 18.4 | 17.9 | — | — | — | — | — | — |
| Day 132 | — | — | 3.6 | — | — | — | — | — |

[a] 0.018 moles $H_2$ (approximately 23 kPa at reaction temperature) also added to reactor
[b] dissolved in pentane
[c] 0.018 moles $H_2$ (approximately 26 kPa at reaction temperature) also added to reactor
[d] Also exhibited a melting endotherm (12 J/g) at 130° C., indicating that the product was a blend of ethylene/methyl styrene copolymer and a small amount of HDPE
[e] Glass-to-rubber transition temperature; polymer was glassy/amorphous After oxygen scavenging testing was complete, the sealed bags were opened. No odors were discerned, indicating that the scavenging process produced few (if any) odiferous oxidation byproducts. This showed that the composition of the present invention can be used to produce packaging materials which can scavenge oxygen without imparting undesirable odors and/or flavors to products packaged therein.

Examples 9–10

Polymerizations similar to those described in Examples 1–8 again were conducted; however, in addition to 3(4)-methylstyrene and ethylene, a third monomer was included.

In addition to the tests run in Examples 1–8, an additional oxygen scavenging test to simulate refrigerated MAP conditions was conducted. The initial oxygen concentration was set at about 1% and the samples were kept at refrigerated temperatures (i.e., about 4° C.).

The materials and conditions used, as well as the properties of the resultant polymer and film, are given below in Table 2.

TABLE 2

| | Sample number | |
|---|---|---|
| | 9 | 10 |
| REACTANTS | | |
| Toluene (g) | 800 | 800 |
| 3(4)-methylstyrene (g) | 49.5 | 50.8 |
| Other monomer | 4-vinylcyclohexene | hexene |
| Amount of other monomer (g) | 45.5 | 35.3 |
| MAO solution (mL) | 6.4 | 3.2 |
| Catalyst precursor (mg) | 4 | 4 |
| $C_2H_4$ pressure in reactor (kPa) | 515[a] | 446 |
| REACTION CONDITIONS | | |
| Reactor temperature (° C.) | 50 | 75 |
| Reaction time (min.) | 90 | 40 |

TABLE 2-continued

| | Sample number | |
|---|---|---|
| | 9 | 10 |
| POLYMER PRODUCT | | |
| Amount recovered (g) | 110 | 136 |
| Melt flow index (dg/min, $I_2$) | 4.45 | 1.22 |
| Melting temp. (° C.) | 97.5 | n/a[b] |
| Mer units derived from 3(4)-methylstyrene (mol %) | 1.2 | 3.9 |
| Mer units derived from other monomer (mol %) | 3.4 | 8.5 |
| Density (g/cm³) | 0.93 | 0.90 |
| $O_2$ SCAVENGING (Standard) | | |
| Film thickness ($\mu$m) | 188 | 277 |
| Film weight (g) | 1.72 | 2.56 |
| % $O_2$ in bag at | | |
| Day 0 | 20.6 | 20.6 |
| Day 1 | 18.7 | 18.4 |
| Day 4 | 12.9 | 7.1 |
| Day 7 | 9.7 | 0.9 |
| $O_2$ SCAVENGING (Low temp.) | | |
| Film thickness ($\mu$m) | 191 | 211 |
| Film weight (g) | 1.23 | 1.90 |
| % $O_2$ in bag at | | |
| Day 0 | 1.12 | 1.10 |
| Day 1 | 1.09 | 1.05 |
| Day 4 | 1.03 | 0.90 |
| Day 7 | 0.77 | 0.72 |
| Day 21 | 0.09 | 0.21 |

[a] Reactor initially pressurized to about 112 kPa with ethylene before being fully pressurized to indicated pressure.
[b] The polymer was amorphous.

Various modifications and alterations that do not depart from the scope and spirit of this invention will become apparent to those skilled in the art. This invention is not to be unduly limited to the illustrative embodiments set forth herein.

We claim:

1. A composition capable of scavenging oxygen comprising:
   a) at least one polymer comprising monomer units derived from at least one vinyl aralkyl compound represented by the formula $CH_2=CHA$ wherein A is an aromatic moiety substituted with at least one $C_1$–$C_{12}$ alkyl group;
   b) a transition metal catalyst;
   c) at least one photoinitiator; and
   d) optionally, at least one diluent polymer.

2. The composition of claim 1 wherein said vinyl aralkyl compound comprises a phenyl group.

3. The composition of claim 1 wherein the polymer comprising monomer units derived from at least one vinyl aralkyl compound represented by the formula $CH_2=CHA$ wherein A is an aromatic moiety substituted with at least one $C_1$–$C_{12}$ alkyl group further comprises monomer units derived from one or more of a $C_2$–$C_{20}$ α-olefin, a cycloolefin, a diene, a (meth)acrylate, styrene, α-methyl styrene, and vinyl acetate.

4. The composition of claim 3 wherein the polymer comprising monomer units derived from at least one vinyl aralkyl compound represented by the formula $CH_2=CHA$ wherein A is an aromatic moiety substituted with at least one $C_1$–$C_{12}$ alkyl croup comprises from about 1 to about 10 mole percent monomer units derived from said at least one vinyl aralkyl compound.

5. The composition of claim 1 wherein the polymer comprising monomer units derived from at least one vinyl aralkyl compound represented by the formula $CH_2=CHA$ wherein A is an aromatic moiety substituted with at least one $C_1$–$C_{12}$ alkyl group comprises from about 1 to about 10 mole percent monomer units derived from said at least one vinyl aralkyl compound.

6. The composition of claim 5 wherein said vinyl aralkyl compound comprises a phenyl group.

7. The composition of claim 1 wherein said polymer comprising monomer units derived from at least one vinyl aralkyl compound represented by the formula $CH_2=CHA$ wherein A is an aromatic moiety substituted with at least one $C_1$–$C_{12}$ alkyl group comprises monomer units derived from ethylene and from a methyl styrene.

8. The composition of claim 7 wherein said polymer comprising monomer units derived from at least one vinyl aralkyl compound represented by the formula $CH_2=CHA$ wherein A is an aromatic moiety substituted with at least one $C_1$–$C_{12}$ alkyl group comprises from about 1 to about 10 mole percent monomer units derived from a methyl styrene.

9. A composition capable of scavenging oxygen comprising:
   a) at least one polymer comprising monomer units derived from
      i) at least one vinyl aralkyl compound represented by the formula $CH_2=CHA$ wherein A is an aromatic moiety substituted with at least one $C_1$–$C_{12}$ alkyl group, and
      one or more Of $C_2$–$C_{20}$ α-olefin, cycloolefin, diene, (meth)acrylate, styrene, α-methyl styrene, and vinyl acetate;
   b) a transition metal catalyst; and c) at least one photoinitiator.

10. The composition of claim 9 wherein the composition comprises at least one photoinitiator.

11. The composition of claim 10 wherein the composition comprises at least one diluent.

* * * * *